(12) United States Patent
Bauer et al.

(10) Patent No.: US 7,763,558 B2
(45) Date of Patent: Jul. 27, 2010

(54) GLASS COMPOSITIONS FOR FIBER FORMATION

(75) Inventors: Jon Frederick Bauer, Castle Rock, CO (US); Jeffrey M. Shock, Castle Rock, CO (US)

(73) Assignee: Johns Manville, Denver, CO (US)

( * ) Notice: Subject to any disclaimer, the term of this patent is extended or adjusted under 35 U.S.C. 154(b) by 695 days.

(21) Appl. No.: 11/645,965

(22) Filed: Dec. 27, 2006

(65) Prior Publication Data

US 2008/0161177 A1 Jul. 3, 2008

(51) Int. Cl.
*C03C 3/089* (2006.01)
*C03C 3/091* (2006.01)
*C03C 13/06* (2006.01)

(52) U.S. Cl. ............... 501/65; 501/35; 501/36; 501/66; 501/72

(58) Field of Classification Search ............ 501/35, 501/36, 65, 66, 72
See application file for complete search history.

(56) References Cited

U.S. PATENT DOCUMENTS

| 598,141 | A | * | 2/1898 | Ferguson | 356/59 |
|---|---|---|---|---|---|
| 3,853,569 | A | * | 12/1974 | Laurent et al. | 501/35 |
| 4,312,952 | A | * | 1/1982 | Carbol | 501/36 |
| 5,055,428 | A | * | 10/1991 | Porter | 501/35 |
| 5,108,957 | A | * | 4/1992 | Cohen et al. | 501/35 |
| 5,206,100 | A | * | 4/1993 | Muto et al. | 429/247 |
| 5,332,698 | A | * | 7/1994 | Nyssen et al. | 501/35 |
| 5,401,693 | A | * | 3/1995 | Bauer et al. | 501/38 |
| 5,945,360 | A | * | 8/1999 | Harding et al. | 501/36 |
| 6,277,777 | B1 | * | 8/2001 | Xu et al. | 501/70 |
| 6,294,491 | B1 | * | 9/2001 | Fay et al. | 501/35 |
| 6,381,989 | B1 | * | 5/2002 | Karmaker et al. | 65/384 |
| 6,399,525 | B2 | * | 6/2002 | Harding et al. | 501/35 |
| 6,828,264 | B2 | * | 12/2004 | Bauer | 501/35 |
| 7,144,633 | B2 | * | 12/2006 | Zguris et al. | 428/432 |
| 7,160,824 | B2 | * | 1/2007 | Zguris et al. | 501/35 |
| 2002/0006856 | A1 | * | 1/2002 | Harding et al. | 501/35 |
| 2005/0079970 | A1 | * | 4/2005 | Otaki et al. | 501/35 |
| 2006/0148634 | A1 | * | 7/2006 | Guter et al. | 501/36 |
| 2007/0117708 | A1 | * | 5/2007 | Zguris et al. | 501/72 |

* cited by examiner

*Primary Examiner*—Karl E Group
*Assistant Examiner*—Elizabeth A Bolden
(74) *Attorney, Agent, or Firm*—Robert D. Touslee

(57) ABSTRACT

Provided is a range of glass compositions and glass fiber products made therefrom that show a unique combination of properties for both discontinuous fiber manufacturing and end use service. The glass compositions are particularly useful in high volume, high throughput, economical processes such as rotary spinning.

7 Claims, No Drawings

GLASS COMPOSITIONS FOR FIBER FORMATION

BACKGROUND OF THE INVENTION

1. Field of the Invention

The present invention relates to novel glass compositions suitable for fiberization by rotary and other discontinuous fiber processes which have a unique and useful set of properties that provide advantages over current technology in both manufacturing and in product end use. The fibers prepared are biosoluble, while also exhibiting a large working range for fiberization.

2. Description of the Related Art

Glass forming compositions suitable for fiberization are typically restricted by their melt and end properties to conform to process specifications and product performance criteria. For example, in production processes used for making discontinuous glass fibers, only certain values for fiberization viscosity and liquidus are acceptable. Moreover, such compositions must demonstrate adequate physical properties such as tensile strength and moisture resistance when formed into fibers by these processes. In addition, recently, it has become increasingly more important that these fibers degrade at sufficiently high rates in the body, such that they pose little to no potential risk to humans if inhaled and can at least be demonstrated to have limited biological effects to laboratory animals when tested.

A good discontinuous glass fiber forming composition should also have good "runability"—the ability to be easily fiberized into long fibers of small diameter with good production rates and little or no shot. While there are many factors involved in this, not all of which have been clearly identified, it is believed that surface tension and lack of tendency for the melt to phase separate or crystallize play key roles. In specific, it is desirable for a glass composition to have as low a surface tension as possible at fiberization temperatures (keeping in mind the other factors above), such that the work done in forming a unit area of surface is kept to a minimum.

The glass must be capable of being melted and fiberized at temperatures low enough for the capability of the equipment and to attain reasonable (economic) production rates. For discontinuous fibers produced by current rotary technology this requires that the HTV value of the glass (temperature when the melt viscosity is 100 Pa s) be less than 1135° C. (2075° F.), preferably less than 1090° C. (1994° F.), and the surface tension of the glass at 1000° C. (1832° F.) be less than 300 dyne/cm.

The glass must not crystallize or devitrify in the melters, forehearths, spinners or anywhere in the system used to melt, contain, transport, or fiberize the glass. Crystallization impairs flow of melt to fiberization orifices. To prevent devitrification and provide a good working range for discontinuous fiberization, the liquidus temperature of the glass must be at least 55° C. (100° F.) below the HTV temperature. However, preferably this difference or working range should be as large as possible to insure smooth, efficient operation and produce long fibers with fine diameters and the least amount of shot. Glasses with working ranges of >200° C. and most preferably >235° C. are most desirable.

In addition to crystallization or liquidus temperature, crystallization rate is also a highly desirable attribute of a discontinuous fiber-forming composition. Here, as low a rate as possible is most desirous. For example, low devitrification rates allow operation under both high temperature conditions where efficient, high throughput production as described above is required or under low temperature conditions when high throughput or volume is not needed or when energy savings become more important. Thus a glass which is capable of both is more flexible in its application and has distinct advantages over more conventional formulations. For best performance, the glass should show crystals no larger than 5 μm in size after 24 hours exposure in a liquidus boat per ASTM C829-81 methodology and crystals no larger than 25 μm in size after 72 hours exposure.

As some applications for discontinuous fiber require the fiber to remain in tact during continual exposure to high temperatures without softening or drooping, the glass must have a reasonably high softening point. To best meet criteria for the majority of these applications, the softening point should be at least 675° C. (1247° F.).

A major application of discontinuous fibers is in thermal insulation. Glasses useful in these applications must be capable of being drawn into fine diameters (less than 1 μm) without breakage into very short lengths (<1 mm) that would render them inferior in regard to providing structural support to the product. As noted above, glasses with large working ranges facilitate this capability.

Because of its high specific surface area, glass fiber must be sufficiently chemically durable, particularly with regard to ambient atmospheric moisture, so that little to no deterioration in fiber strength occurs with time during packaging, shipping, and storage prior to end use. The moisture resistance of a glass fiber can be correlated with its thermodynamic tendency to react with water as measured by its free energy of hydration ($\Delta G_{hyd}$). For nearly all commercial glass fiber, this value is negative, indicating that the fibers will over time react. Large negative values of $\Delta G_{hyd}$ represent a strong tendency to degrade by reaction with moisture which frequently correlates with high rates of hydration reactions. This is critical for discontinuous fibers used in building, mechanical, automotive, aircraft or OEM equipment applications which provide insulation and structural performance. For fiber to perform adequately and preserve tensile properties in moist or humid environments, the free energy of hydration should not be less than (more negative than) −6.0 kcal/mole as calculated by the methods described in U.S. Pat. No. 5,401,693, which is herein incorporated by reference in its entirety.

Because the fiber is of very fine diameter and capable of being respired, it must also degrade in the body at a rate that is sufficiently rapid so as not to induce respiratory diseases, especially chronic diseases such as emphysema or cancer. Measured in vitro dissolution rates for the fiber in simulated physiological saline ($k_{dis}$) must be greater than 100 ng/cm² hr. and more preferably greater than 250 ng/cm² hr. More importantly, the fiber must demonstrate capability to decompose in vivo. An accepted evaluation is that provided by EU protocols ECB/TM 26 or TM 27 rev. 7. For ECB/TM 27 rev. 7. (exposure by intratracheal instillation), fibers of greater than 20 μm in length must be cleared from the lung at a rate sufficient to achieve a fiber biopersistence half life (t ½) of less than 40 days. Glass fiber compositions that are particularly desirable are those that can far exceed fiber clearance rates in animal tests specified by these methods, i.e. those with a good "safety margin".

There is a need in the industry for glass compositions and products made therefrom which exhibit the unique combination of properties as discussed above. While many current glass fiber formulations provide one or more of the requisite properties noted, the industry is still searching for the glass compositions which provide the glass chemistries necessary to meet all of the foregoing manufacturing and product performance needs. It is an object of the present invention to provide such glass compositions and products made therefrom.

SUMMARY OF THE INVENTION

This invention provides a range of glass compositions and products made therefrom that show unique combinations of properties for both discontinuous fiber manufacturing and end use in service. They are particularly useful in high volume, high throughput, economical processes such as rotary spinning. These glass types combine the following desirable features as described above:

1. Biosolubility—high in vitro dissolution rates and demonstrated capability to rapidly dissolve in lungs of laboratory animals;

2. Low liquidus temperature and large working range—allowing for smooth and uninterrupted fiberization and the formation of long individual fibers without frequent breaks;

3. High softening point—allowing fibers to be used in moderately high temperature applications without sagging, drooping or melting;

4. Good moisture resistance required for tensile strength retention in product even under hot, humid conditions;

5. Low crystallization rate—combined with low liquidus temperature (2 above), this provides much greater process flexibility than currently available by conventional technology; and 6. Low viscosity and surface tension—providing low forming stresses and the ability for efficient continuous production described above.

Many current glass fiber formulations provide one or more of the above features, but only the glass compositions of the present invention have the unique glass chemistries necessary to provide the optimal combination of these features to meet manufacturing and product performance needs. Glass formulations which do meet all the above requirements are given by the following ranges:

| Oxide Component | Mole % |
| --- | --- |
| $SiO_2$ | 65.5-70 |
| $Al_2O_3$ | 0-2.25 |
| $B_2O_3$ | 0-7 |
| CaO | 2-18 |
| MgO | 0-6 |
| BaO | 0-0.5 |
| $Na_2O$ | 9-20 |
| $K_2O$ | 0-5 |

DETAILED DESCRIPTION OF THE PREFERRED EMBODIMENTS

The glass compositions and products of the present invention provide a unique combination of properties. The fibers made from the glass compositions show good biosolubility, i.e., they degrade in the body at a rate that is sufficiently rapid so as not to induce respiratory diseases. Measured in vitro dissolution rates for the fiber in simulated physiological saline ($k_{dis}$) is greater than 100 ng/cm$^2$/hr, more preferably greater than 200 ng/cm$^2$/hr, and preferably greater than 250 ng/cm$^2$/hr. The fibers also demonstrate a capability to decompose in vivo. An accepted evolution for this characteristic is provided by EU protocols ECB/TM 26 or TM 27 rev. 7. For ECB/Tm 27 rev. 7, fibers of greater than 20 μm in length must be cleared from the lung at a rate sufficient to achieve a fiber biopersistence half life (t ½) of less than 40 days. The glass compositions of the present invention provide glass fibers which meet this standard.

The glass compositions of the present invention also exhibit a low liquidus temperature and a large working range. This allows for smooth and uninterrupted fiberization and the formation of long individual fibers without frequent breaks. The difference between the liquidus temperature and the HTV value of the glass is greater than 200° C., more preferably greater than 235° C., and most preferably greater than 225° C.

The softening point of the fibers prepared from the glass composition of the present invention is also relatively high, e.g., greater than 675° C. This allows the fibers to be used in moderately high temperature applications without sagging, drooping or melting.

Moisture resistance of the glass fiber products of the present invention is also an important characteristic. The glass fiber must be sufficiently chemically durable with regard to moisture, particularly ambient atmospheric moisture, so that little or no deterioration in fiber strength occurs during packaging, shipping and storage prior to end use. Generally, this resistance is measured in terms of the free energy of hydration ($\Delta G_{hyd}$). The moisture resistance is generally more positive than $-6.0 \, \Delta G_{hyd}$ in kcal/mole.

The crystallization rate of the glasses of the present invention must be low to provide greater process flexibility than currently available by conventional technology. Crystallization impairs flow of melt to fiberization orifices. It is preferred that the glass show crystals no larger than 5 μm in size after 24 hours exposure as measured per ASTM C829-81, and crystals no larger than 25 μm in size after 72 hours exposure.

Viscosity and surface tension are important to providing low forming stresses and to the ability for efficient continuous production. The surface tension of the glass at 1000° C. in dyne/cm is preferably less than 300.

The glass formulations which best meet these requirements are as follows:

| Oxide Component | Mole % | Most Preferred Mole % |
| --- | --- | --- |
| $SiO_2$ | 65.5-70 | 66-69.5 |
| $Al_2O_3$ | 0-2.25 | 0-2 |
| $B_2O_3$ | 0-7 | 3-7 |
| CaO | 2-18 | 3-8.5 |
| MgO | 0-6 | 0-6 |
| BaO | 0-0.5 | 0.1-0.5 |
| $Na_2O$ | 9-20 | 13-17 |
| $K_2O$ | 0-5 | 0-2 |

The following example is provided to demonstrate the production of exceptional glass fibers when using a glass formulation in accordance with the present invention. The following example is provided as illustrative, and is not meant to be limitative.

EXAMPLE

A discontinuous glass fiber produced by rotary spinning of the composition shown below shows the combination of desirable properties as set forth in the table below:

EXAMPLE

| Oxide Component | Mole % |
| --- | --- |
| $SiO_2$ | 67.3 |
| $Al_2O_3$ | 1.0 |
| $B_2O_3$ | 6.1 |
| CaO | 4.8 |
| MgO | 5.2 |
| BaO | 0.1 |
| $Na_2O$ | 15.1 |
| $K_2O$ | 0.3 |

By comparison, a conventional glass fiber produced by rotary spinning has the following composition and exhibits some, but not all, of the desirable properties, as set forth in the table below.

| Conventional glass | |
| --- | --- |
| Oxide Component | Mole % |
| $SiO_2$ | 64.7 |
| $Al_2O_3$ | 2.3 |
| $B_2O_3$ | 3.9 |
| CaO | 8.2 |
| MgO | 4.3 |
| BaO | 0 |
| $Na_2O$ | 15.3 |
| $K_2O$ | 0.9 |

Also by comparison, a biosoluble glass fiber produced by rotary spinning a glass composition of the following composition also exhibits some, but not all, of the desirable properties, as shown in the table below:

| Conventional biosoluble glass | |
| --- | --- |
| Oxide Component | Mole % |
| $SiO_2$ | 57.8 |
| $Al_2O_3$ | 3.1 |
| $B_2O_3$ | 7.7 |
| CaO | 7.0 |
| MgO | 6.8 |
| BaO | 0 |
| $Na_2O$ | 16.8 |
| $K_2O$ | 0.7 |

TABLE

Key Properties

| Property | Example | Conventional Glass | Conventional Biosoluble Glass | Target |
| --- | --- | --- | --- | --- |
| Biosolubility, in vitro $k_{dis}$ ($ng/cm^2$ hr.) | 350 | 100 | 500 | >250 |
| Biosolubility, in vivo $t\frac{1}{2}$* (days) | 10.6 | 61 | 8.1 | <40 |
| Liquidus temperature (° C.) | 782 | 914 | 926 | See working range |
| Working range (° C.) | 256 | 167 | 66 | >235 |
| Softening point (° C.) | 687 | 690 | 660 | >675 |
| Moisture resistance ($\Delta G_{hyd}$ in kcal/mole) | −5.9 | −6.4 | −7.2 | >−6.0 (more positive than −6.0) |
| Avg. crystal size (μm) at liquidus, 24 hours | undetectable | n.a. | 98 | <5 |
| Avg. crystal size (μm) at liquidus, 48 hours | 5 | n.a. | >100 | <25 |
| Avg. crystal size (μm) at liquidus, 72 hours | 16 | n.a. | >100 | <25 |
| Avg. crystal size (μm) at liquidus, 120 hours | 24 | n.a. | >100 | <25 |
| HTV (° C. at 100 Pa s viscosity) | 1064 | 1082 | 993 | <1090 |
| Surface tension at 1000° C. (dyne/cm) | 290 | n.a. | 350 | <300 |

*for fibers >20 μm in length per EU protocol ECB/TM27 rev. 7.

The results in the Table show that the preferred fiber of the Example meets or exceeds all performance criteria specified in the Table. Particularly noteworthy is that this fiber demonstrated a very large working range for fiberization and an extremely low crystal growth rate at or below liquidus, making it highly preferred for production.

While the invention has been described in detail and with reference to specific embodiments thereof, it will be apparent to one skilled in the art that various changes and modifications can be made therein without departing from the spirit and scope thereof.

What is claimed is:

1. A glass composition comprised of the following components:

| Oxide Component | Mole % |
| --- | --- |
| $SiO_2$ | 66-69.5 |
| $Al_2O_3$ | 0-2 |
| $B_2O_3$ | 3-7 |
| CaO | 3-8.5 |
| MgO | 0-6 |
| BaO | 0.1-0.5 |
| $Na_2O$ | 13-17 |
| $K_2O$ | 0-2 | wherein the composition and fibers prepared therefrom exhibit a biosolubility of at least 100 ng/cm²/hr; a difference between the liquidus temperature and the HTV value of at least 200° C.; a softening point of at least 675° C.; a moisture resistance more positive than 0.6 $\Delta G_{hyd}$ kcal/mole; a crystallization rate such that crystals no larger than 5 μm in size after 24 hour exposure and crystals no larger than 25 μm in size after 72 hours exposure are observed; and a surface tension of less than 300 dyne/cm at 1000° C.

2. The glass composition of claim 1, wherein the biosolubility is at least 250 ng/cm²/hr; and the difference in liquidus temperature and HTV value is at least 235° C.

3. Glass fibers produced by rotary spinning the glass composition of claim 1.

4. Glass fibers produced by rotary spinning the glass composition of claim 2.

5. A low density composite compound of the glass fibers of claim 3.

6. Glass fiber insulation compound of the glass fibers of claim 3.

7. Glass fiber insulation compound of the glass fibers of claim 4.

* * * * *